Figure 1:
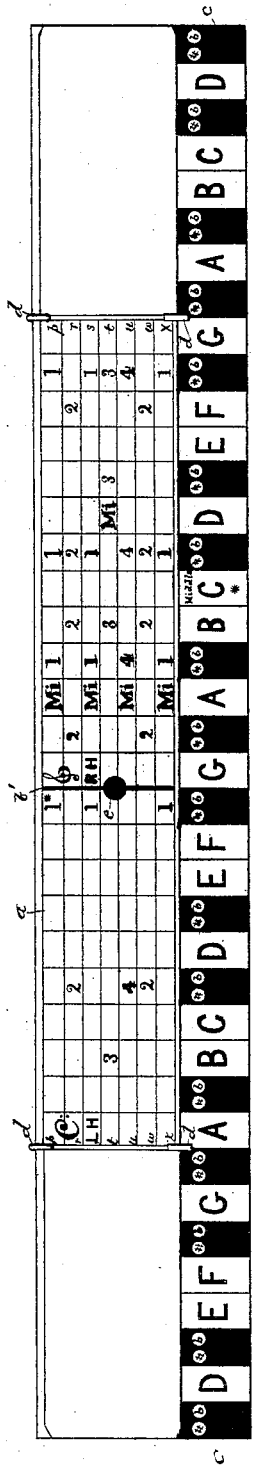

N. P. B. CURTISS.
INDICATORS FOR PIANOS OR ORGANS.

No. 194,654. Patented Aug. 28, 1877.

Witnesses
E. C. Perkins.
W. A. Pratt.

Inventor
Nathan P. B. Curtiss
By Crosby & Gregory Attys

UNITED STATES PATENT OFFICE.

NATHAN P. B. CURTISS, OF BOSTON, MASSACHUSETTS.

IMPROVEMENT IN INDICATORS FOR PIANOS OR ORGANS.

Specification forming part of Letters Patent No. 194,654, dated August 28, 1877; application filed June 19, 1877.

*To all whom it may concern:*

Be it known that I, NATHAN P. B. CURTISS, of Boston, in the county of Suffolk and State of Massachusetts, have invented an Improvement in Indicators for Pianos or Organs, of which the following is a specification:

This invention has reference to an indicator or attachment to be applied to pianos or organs, to assist a student to correctly play any of the regular chords or scales in any key—major or minor.

The indicator is adapted to be placed on or above the back of the keys before the student, and is provided with an imitation key-board, having spaces of contrasting colors, preferably white and black, to designate the natural and the flat and sharp keys.

Above this imitation key-board is placed a slide, having, preferably, seven longitudinal lines to indicate, first, the tonic or key-note chord, or the first letter of the scale; second, the dominant seventh or discord, or fifth letter of the scale; third, a repetition of the first line; fourth, the subdominant, or fourth letter of the scale; fifth, the dominant harmony or second inversion of the tonic, or first letter of the scale; sixth, a repetition of the second line; and, seventh, a repetition of the first line.

The drawing shows one of my improved indicators.

The lines just above described are designated $p\ r\ s\ t\ u\ w\ x$. I have divided these lines vertically to correspond with the width of the keys of the piano or organ, and on the small squares so formed I have arranged, above the lines, the figures to designate the keys to be simultaneously touched.

The slide $a$ is preferably divided by a strong vertical line or double bar, $b'$, so as to designate the keys for the right and left hands.

To play the chords of any desired scale, move the slide until the row of figures 1 at the left of the double line comes over the key-note of said chord, whatever it may be, and then the figures on the slide falling above the keys will indicate the keys which should be struck, commencing at the first line and descending, to correctly play all chords belonging to such key.

I preferably mark the dark spaces of the key-board $c$ with the letter "b" and the character "♯," to designate the flats and sharps of the adjacent keys.

The imitation key-board and slide may be made of paper board or any other suitable material. The slide is held and guided, in this instance, by loops $d\ d$, and a small knob, $e$, enables the slide to be moved.

Upon the slide opposite each horizontal line I prefer to place a description of the chords contained or represented on such lines. Such other explanatory matter as may be desired or necessary may be printed thereon, or on the back of the imitation key-board, which will preferably stand or rest on or just above the back portions of the keys.

The spaces marked "Mi" designate the keys to be struck to play the minor chords, the finger being then placed on "Mi" instead of upon the figures to the right.

The indicator may be of any desired length, and extend over two or more octaves. Figures are shown upon the lines; but, instead thereof, letters, characters, or contrasting shades or colors may be employed.

This indicator is of great importance in the practice of transposition, as it will enable the student to play in all the sharp or flat keys as easily as in the natural. The single slide serves as a guide by which to play in all the fifteen major and fifteen minor keys.

In playing the arpeggio-chord scales it will indicate the position of the fingers in every octave, and the correct sharps and flats.

By its use a student is enabled to quickly tell the name of any chord used in any written piece of music, and the key it belongs in, and the position it occupies in its own scale and key. It is also useful to those desiring simply to play accompaniments, and is of material assistance to students in the study of harmony and thorough-bass.

As shown in the drawing, the indicator is set for the key of G-flat, which has six flats, or the key of F-sharp, which has six sharps.

I do not broadly claim a slide in connection with an indicator-card for musical instruction.

I claim—

1. The imitation key-board, in combination with the connected guided slide provided with a series of horizontal spaces, marked to denote the keys to be touched to play the several chords designated on and by such slide, substantially as described.

2. A slide for a piano or organ indicator, provided with seven lines to indicate the chords described, and marked to designate the keys to be touched to play such chords, substantially as described.

In testimony whereof I have signed my name to this specification in the presence of two subscribing witnesses.

NATHAN P. B. CURTISS.

Witnesses:
G. W. GREGORY,
S. B. KIDDER.